United States Patent [19]

Gunnerson

[11] Patent Number: 4,632,027
[45] Date of Patent: Dec. 30, 1986

[54] APPARATUS AND METHOD FOR COMPRESSING PLIABLE ARTICLES

[75] Inventor: Robert E. Gunnerson, Manteca, Calif.

[73] Assignee: Sunsweet Growers, Inc., Stockton, Calif.

[21] Appl. No.: 713,062

[22] Filed: Mar. 18, 1985

Related U.S. Application Data

[63] Continuation-in-part of Ser. No. 540,572, Oct. 7, 1983, abandoned.

[51] Int. Cl.$^4$ .............................................. A23P 1/00
[52] U.S. Cl. .................................... 99/485; 99/646 R; 425/233; 425/360; 425/DIG. 19; 425/DIG. 124
[58] Field of Search ................ 99/485, 489, 490, 537, 99/538, 547, 548, 551, 545, 564, 549, 565, 566; 425/233, 335, 357, 360, 370, 371, DIG. 19, DIG. 124; 426/443, 665, 512, 484, 485

[56] References Cited

U.S. PATENT DOCUMENTS 4,168,658 9/1979 Silvestrini .............................. 99/551
4,307,660 12/1981 Clavel .................................... 99/574

Primary Examiner—Timothy F. Simone
Attorney, Agent, or Firm—Townsend and Townsend

[57] ABSTRACT

An apparatus and method are disclosed for a continuous compressing operation involving receiving pliable articles, compressing them along a single axis, and releasing them once compresssed. The apparatus and method each involve the use of a pair of disks arranged in a V-shaped configuration, with their opposing surfaces contoured to form opposing recesses which, together with a flexible barrier spanning the space between the disks, define a pocket opening toward the rims of the disks for receiving the article and retaining it during compression. The disks are rotated while maintaining the V shape, thereby causing the pocket and hence the retained article to become compressed. Once the narrowest point of the V is passed, the compressed article is released by gravitational force.

4 Claims, 2 Drawing Figures

U.S. Patent   Dec. 30, 1986   4,632,027
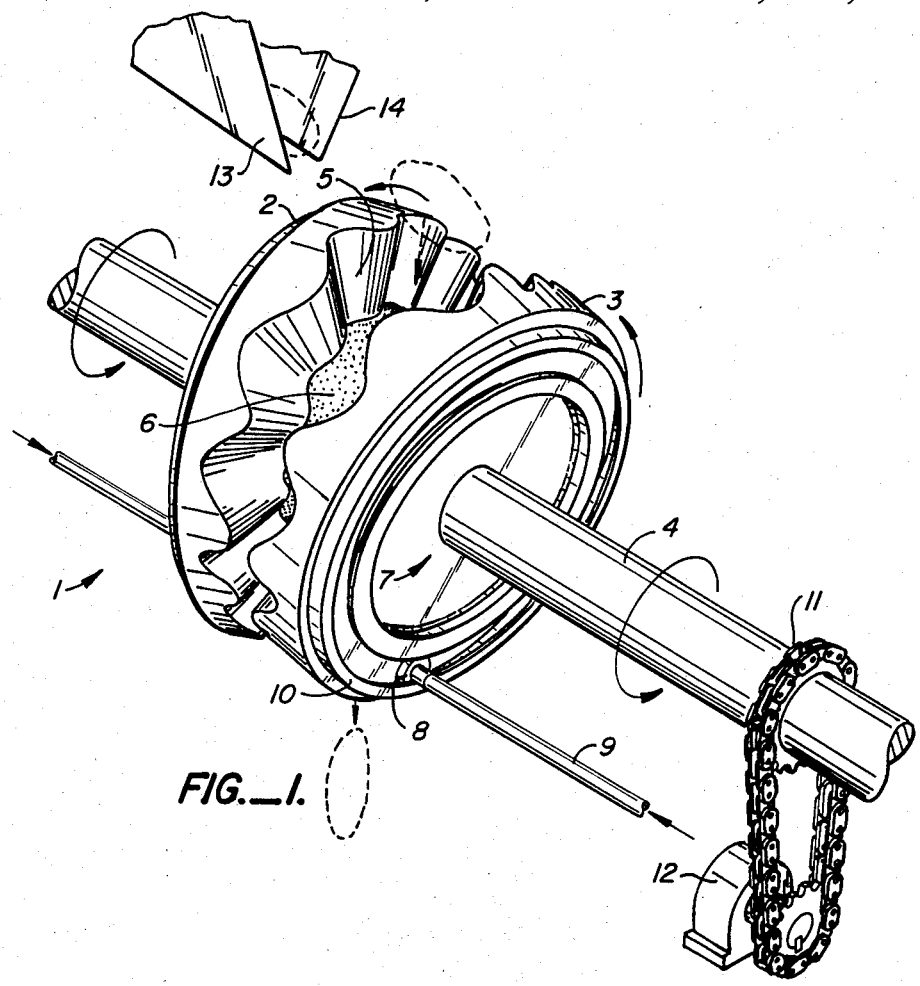
FIG.—1.
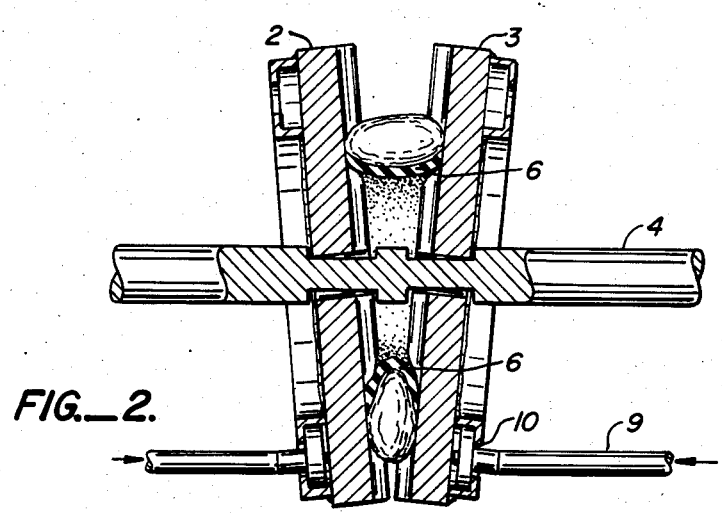
FIG.—2.

APPARATUS AND METHOD FOR COMPRESSING PLIABLE ARTICLES

CROSS REFERENCE TO RELATED APPLICATION

This application is a continuation-in-part of copending application Ser. No. 06/540,572, filed Oct. 7, 1983, now abandoned.

BACKGROUND OF THE INVENTION

1. Field of the Invention

The present invention relates to machinery for flattening pliable articles. In particular, this invention relates to fruit handling machinery for compressing fruits, and most prticularly for compressing oblong fruits along their long axis. This invention has particular utility in the shaping of pitted prunes.

2. Description of the Prior Art

Fruits and other food items are often reshaped prior to packaging. This serves to enhance their appearance and their utility in food preparations. A prime example is the Sunsweet pitted prune which, prior to being packaged for sale to the consumer, is compressed along its longitudinal axis. The result is a generally circular flattened shape, with the fruit flesh concentrated toward the periphery and a void or depression in the center. This shape permits the formation of a pocket in the center while still maintaining full closure of the fruit flesh by the skin. This unique and desirable shape provides a marketing advantage for a number of reasons, including uniformity of size and shape, ease of packaging, pleasing texture, and relatively smooth surface. The central pocket is suitable for stuffing with garnishes, and thus useful in preparing hors d'oeuvres and fruit salads. In addition, prunes of this unique shape are generally more suitable for eating out of hand.

Existing machinery for producing pitted prunes shaped in this manner generally combines both the pitting function and the shaping function. Examples are those described in Cantoni et al., U.S. Pat. No. 3,260,291 (July 12, 1966) and Cantoni et al., U.S. Pat. No. 3,333,618 (Aug. 1, 1967). Other devices remove the pits without compressing. Examples are those disclosed in Ashblock, U.S. Pat. No. 2,528,294 (Oct. 31, 1950); Ashlock, U.S. Pat. No. 2,589,324 (Mar. 18, 1952); Ashlock, U.S. Pat. NO. 2,604,131 (July 22, 1952); Ashlock, U.S. Pat. No. 2,614,594 (Oct. 21, 1952); Margaroli et al., U.S. Pat. No. 3,469,612 (Sept. 30, 1969); and Margaroli et al., U.S. Pat. No. 3,556,281 (Jan. 19, 1971).

SUMMARY OF THE INVENTION

A novel device and method are provided for the compression or flattening of a pliable article. The apparatus generally comprises a pair of rotating canted disks whose shape, contour, and position relative to each other cause them to form a pocket for receiving and holding the article in a particular preselected alignment, then move together as they rotate, narrowing the pocket and compressing the article while still maintaining the alignment. The result is a simple, convenient, and efficient design with a minimum of moving parts.

BRIEF DESCRIPTION OF THE DRAWINGS

FIG. 1 is a perspective view of an illustrative embodiment of the present invention.

FIG. 2 is a side cross-sectional view of the embodiment of FIG. 1.

DESCRIPTION OF THE SPECIFIC AND PREFERRED EMBODIMENTS

The following is offered to demonstrate the structure and function of the invention in a variety of illustrative embodiments, with particular reference to the embodiment shown in the attached drawings.

The figures illustrate two views of a compressing apparatus 1 according to the present invention. The apparatus generally comprises a pair of rotatable disks 2 and 3 arranged in a substantially vertical V-shaped configuration. In the embodiment shown, these disks are mounted on a common horizontal support shaft 4 passing through the center of each disk. The inner surface of each disk contains a series of recesses, shown in the figures as radially directed grooves or furrows 5, each furrow on one disk directly facing an opposing furrow on the other. The furrows have a curved concave contour, the width of each appropriately selected with reference to the size and proportions of the article being compressed. Each furrow is at least as wide as necessary to accommodate the object, both before and after compression. For oblong articles of which compression is desired along the longest dimension, the width and curvature of the furrow will accommodate the smallest radius of curvature of the object, yet permit the expansion which occurs upon compression. In addition, the furrow is sufficiently narrow and has a suffeciently small radius of curvature to prevent an oblong article from rotating between the disks and thus moving out of alignment.

The number of furrows on the inner surface of each disk is not critical, and may range from a single furrow to a continuous series extending over the entire surface of the disk. The latter is the preferred structure, providing a scalloped effect as shown in FIG. 1. This permits several articles to be compressed at the same time and thus enhances the efficiency of the operation.

Each pair of opposing furrows forms a pocket closed at the bottom by a flexible membrane 6. The latter serves to receive the object as it is fed to the space between the disks for compression, and also forms a barrier between the pocket and the mounting shaft 4 on which the disks are supported.

The membrane is flexible and may be elastic, but is sufficiently narrow in its spanning width to maintain the original alignment of the article during compression, yet permit radial expansion of the article away from the axis of compression. The article is fed to the pocket at the point in rotation where the disks are separated to their maximum extent. For oblong articles, the membrane need not be taut at this point but should have sufficiently little slack that the axis of the object will lie parallel to the shaft. The membrane may be constructed of any flexible durable material such as, for example, neoprene rubber. Its position along the radius of the disks is not critical, but preferably sufficiently close to the outer perimeter of each disk to place the object at a point along the disk radius where it will receive the maximum compression as the disk rotate. For disks having a continuous series of furrows forming a scalloped effect, the membrane should completely encircle the support shaft 4 to form a closed deformable cylinder between the disks.

The disks are mounted in such a manner as to permit the rotation of each about its center and yet maintain the vertical V arrangement. This can be accomplished by a variety of mounting arrangements. In the embodiment shown in the drawings, the disks are mounted on the shaft 4 through a connection 7 which prevents the disks from sliding along the shaft yet permits the tilting or canting of each disk so that its plane may be freely rotated away from the plane perpendicular to the axis of the support shaft, at least within a predetermined angle. In addition, the disk centers are mounted on the shaft at a predetermined distance from each other, leaving sufficient room for the disks to be biased toward each other at the base to form the V. The actual distance between the disks and their point of mounting to the shaft is not critical. Appropriate selection of this distance will vary with the size and shape of the article being compressed. This distance together with the location of the membrane along the disk radius and the angle of tilt will be appropriately adjusted for oblong articles to accommodate the article without leaving an excess of free space between the article and the disk surface. This will help to avoid a substantial shift of position of the article as the disks rotate and come together.

A biasing contact 8 is located on the outer surface of each disk, generally below the shaft. These contacts tilt the disks toward each other to form a V as mentioned above. The position of each contact is fixed in space and thus moves with respect to its corresponding disk as the disk rotates, thereby describing a circle on the outer disk surface. The contacts are comprised of sliding or rolling connections which maintain full contact with the disks as the disks rotate. The biasing contacts are preferably located directly beneath the support shaft, as shown in the drawings. The narrowest space between the disks is then at the bottom, and the center line of the V is approximately vertical.

In the embodiment shown in the drawings, each contact consists of an adjustable screw 9 mounted on the rigid frame of the apparatus (not shown), and cooperating with a circular channel 10 on the outer face of each disk. The channel is preferably a locking channel, capable of retaining the screw head and minimizing the wobbling of the disks as they rotate.

Rotation of the disks is achieved in any conventional manner, provided the disks rotate together at the same rate and in the same direction, so that corresponding grooves remain opposed to each other at all points during the rotation. This is readily accomplished in a variety of ways known to those skilled in the art. For example, the support shaft itself may be rotated or a separate drive mechanism may rotate the disks directly. The embodiment shown in the drawings utilizes the former method, wherein the support shaft 4 is rotated by a chain-gear 11 driven by a motor 12. The mounting connection 7 appropriate for either of these methods or equivalent methods will be readily apparent to those skilled in the art.

The articles to be compressed are fed to the apparatus in a manner which is coordinated with the disk rotation. In preferred embodiments, the feed mechanism aligns and orients the articles as desired for compression, and also spaces them so that they will enter each pocket as it reaches its point of widest expansion. For oblong objects, the longest dimension must be parallel to the axis of the shaft 4. The spacing and rate of feed are thus coordinated with the width of each of the furrows on the disks and the rate of the disk rotation. Feeding to meet these requirements is accomplished by conventional apparatus, of which a wide variety of designs are known. Examples include those disclosed in Smitt, U.S. Pat. No. 1,922,717 (Aug. 15, 1933); Magnuson, U.S. Pat. No. 2,534,362 (Dec. 19, 1950); Harvey et al., U.S. Pat. No. 2,787,361 (Apr. 2, 1957); Daugherty, U.S. Pat. No. 3,212,621 (Oct. 19, 1965); Gerrans, U.S. Pat. No. 3,460,668 (Aug. 12, 1969); and Green, U.S. Pat. No. 3,923,143 (Dec. 2, 1975). In the embodiment shown in the drawings, the feed mechanism is a pair of plates 13, 14 arranged in V-shaped configuration preferably at a slight decline with respect to the horizontal. The plates form a trough which aligns the articles as it directs them one at a time into the uppermost pocket between the dishes. To enhance the movement of the articles as well as their alignment, the plates may be oscillated 180° out of phase with each other along the direction of movement of the articles. As a further option, a timed gate (not shown) may be placed in front of the plates to coordinate the article feed with the position of the dishes 2, 3 during their rotation.

The finished articles are readily removed from the apparatus by gravitational force. Once the article passes the point of narrowest gap width between the disk, it is no longer held captive and falls free. Depending on the nature of the object, particularly in the case of food products, removal may by enhanced by a gentle stream of water.

The apparatus as herein disclosed is useful for the compression of any pliable or compressible object, and is particularly useful on oblong objects sought to be compressed along their axis. The device finds considerable utility in the food processing industry, notably the shaping of food products such as fruits, particularly pitted prunes. For prune preparation, the apparatus is conveniently used in conjunction with pit removal machines, such as those disclosed in Ashlock, U.S. Pat. No. 2,589,324 (Mar. 18, 1952); Ashlock, U.S. Pat. NO. 2,604,131 (July 22, 1952); Ashlock, U.S. Pat. NO. 2,614,594 (Oct. 21, 1952); Cantoni et al., U.S. Pat. No. 3,234,984 (Feb. 15, 1966); Cantoni et al., U.S. Pat. NO. 3,282,314 (Nov. 1, 1966); Margaroli et al., U.S. Pat. No. 3,469,612 (Sept. 30, 1969); and Margaroli et al., U.S. Pat. No. 3,556,281 (Jan. 19, 1971).

The foregoing description is offered primarily for purposes of illustration. While a variety of embodiments has been disclosed, it is not intended that the present invention be limited to the particular structures or methods of operation set forth above. It will be readily apparent to those skilled in the art that numerous modifications and variations not mentioned here can still be made without departing from the spirit and scope of the invention as claimed hereinbelow.

What is claimed is:

1. Apparatus for compressing a pitted prune along its longest dimension, comprising:

a pair of disks arranged in a substantially vertical V-shaped configuration, the opposing surfaces of said disks forming at least one pair of opposing recesses to accommodate said pitted prune, means for rotating said disks about their centers at the same rate and in the same direction while maintaining said substantially vertical V-shaped configuration, means for feeding said pitted prune into the space between said recesses at the point in the rotation where said recesses are located at the widest portion of said V and with said longest dimension parallel to the line connecting the centers of said disks, and a flexible membrane connecting said disks and spanning the space between said recesses to define a pocket opening toward the rims of said disks, said membrane being sufficiently taut to maintain the orientation of said pitted prune as said disks rotate.

2. Apparatus according to claim 1 in which said disks are cantably mounted at the centers thereof on a common horizontal shaft and said V-shaped configuration is maintained by biasing the edges of said disks toward each other below said shaft at a point which remains fixed as the disks rotate.

3. Apparatus according to claim 1 in which said opposing recesses are radial furrows.

4. Apparatus according to claim 1 in which said opposing recesses are radial furrows and the opposing surfaces of said disks form a continuous series of said opposing radial furrows extending over the entire inner surface of each said disk, and said flexible barrier is in the form of a deformable cylinder encircling the line defined by the centers of each disk.

* * * * *